PULSE GENERATOR EMPLOYING SHOCK-EXCITED CIRCUIT AND FIRST AND SECOND VARIABLE-BIAS MEANS FOR STABILITY AND FREQUENCY ADJUSTMENT

Filed Sept. 28, 1962

INVENTOR.
JOSEPH J. ZYSKOWSKI

BY

Laurence S. Epstein
ATTORNEY

United States Patent Office 3,166,718

Patented Jan. 19, 1965

3,166,718

PULSE GENERATOR EMPLOYING SHOCK-EXCITED CIRCUIT AND FIRST AND SECOND VARIABLE-BIAS MEANS FOR STABILITY AND FREQUENCY ADJUSTMENT

Joseph J. Zyskowski, Rockaway, N.J., assignor, by mesne assignments, to the United States of America as represented by the Secretary of the Navy Filed Sept. 28, 1962, Ser. No. 227,690

2 Claims. (Cl. 328—183)

This invention relates to electron tube circuits and is more particularly directed to stable oscillator circuits for generating stable pulses.

The primary object of the instant invention is to provide a novel pulse generator circuit wherein signals from a sawtooth generator initiate oscillations in a shock-excited oscillator.

A further object of the instant invention is to provide a novel pulse generator circuit wherein signals from a sawtooth generator initiate oscillations in a shock-excited oscillator whose frequency is able to be controlled.

Still another object of the instant invention is to provide a novel pulse generator for providing stable output pulses of adjustable frequency rates.

Other objects and many of the attendant advantages of this invention will be readily appreciated as the same becomes better understood by reference to the following detailed description when considered in connection with the accompanying drawings wherein.

Figures 1, 2:
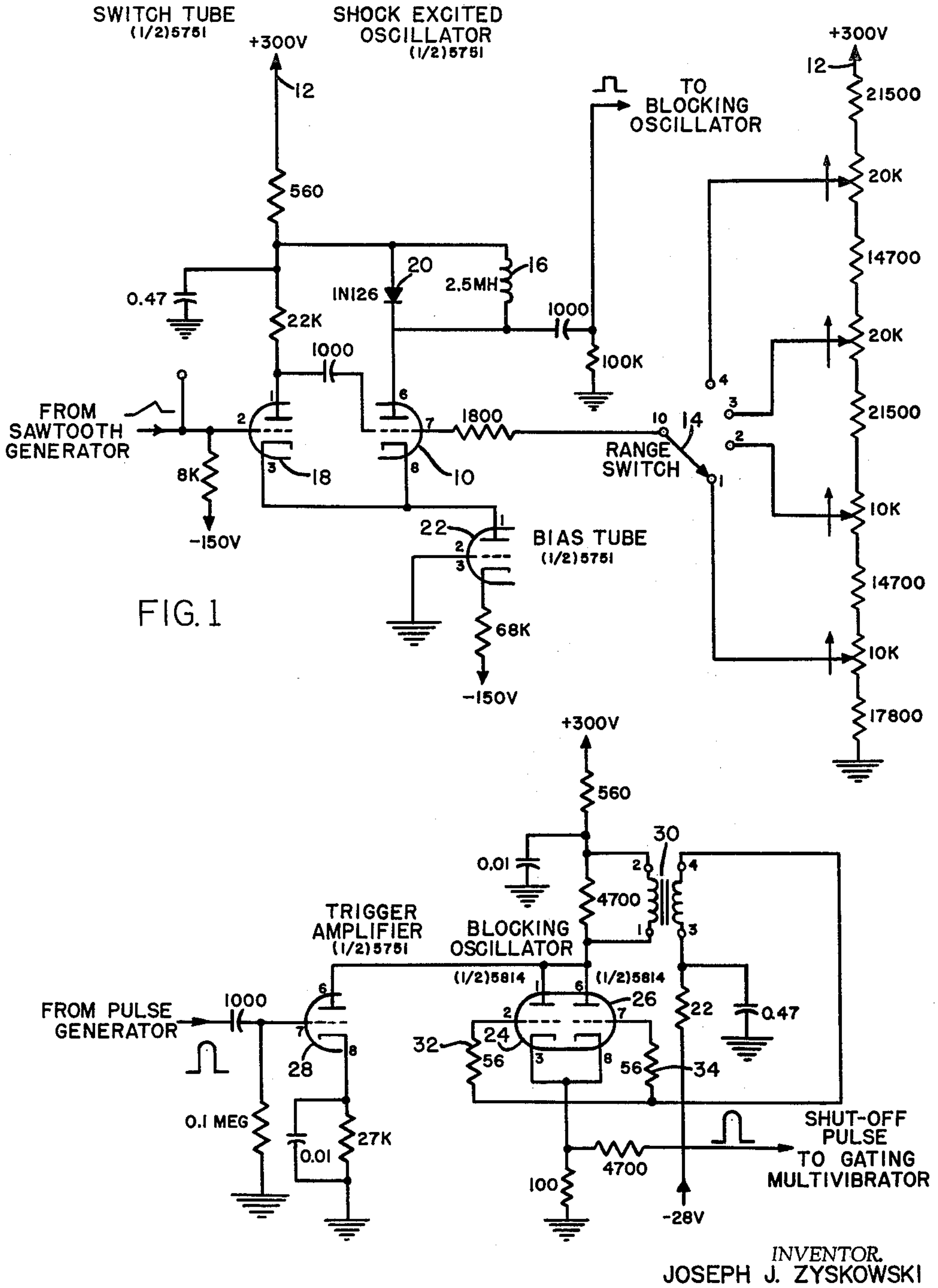
FIG. 1 is a schematic diagram of the adjustable pulse generator circuitry.
FIG. 2 is a schematic diagram of the blocking oscillator.

Referring now to the drawings, tube 10 is connected as a shock-excited generator. The grid of tube 10 is connected to the plate supply 12 by range selector switch 14 so that the grid is positive when the pulse signal is applied. Tube 10 is thus normally conducting so that current flows through inductor 16 in the plate circuit. Since the D.C. resistance of inductor 16 is very low, the drop across it is negligible, and the plate of the tube is practically at the supply voltage. Tube 10 is cut off when the negative going sawtooth from tube 18 reaches an amplitude sufficiently negative to overcome the positive bias on the grid. Range selector switch 14 is set so that this will occur when the sawtooth reaches its maximum negative amplitude. At this instant, tube 10 is cut off and the plate current drops to zero. However, the current in inductance 16 cannot change instantaneously, but tends to oscillate in the resonant circuit formed by inductor 16 and its distributed capacitance. The voltage thus induced across inductor 16 is of a polarity that tends to keep the original current flowing through the tube. This results in a positive voltage pulse at the plate of this tube 10 which is actually the first-half cycle of a series of oscillations that would occur if crystal diode 20 were not connected across inductor 16. Only the first positive going cycle of the oscillation appears at the plate in the form of a single, narrow positive pulse because when the voltage of the plate side of inductor 16 is negative, crystal 20 conducts and short circuits the voltage across inductor 16.

Bias tube 22 in the common cathode circuit of tubes 10 and 18 is operated as a grounded grid amplifier. The purpose of bias tube 22 is to provide stabilization of the pulse generator circuit against power supply voltage drifts. This tube acts as a variable resistance which adjusts itself to a value that automatically compensates for different positions of the range switch 14. In this manner, the grounded grid amplifier compensates for operating voltage changes in the pulsed generator circuit.

Output from the pulsed generator triggers the blocking oscillator which is shown in FIG. 2. This blocking oscillator circuit uses twin triode tubes 24 and 26 and one-half of twin triode 28. The positive trigger from the pulse generator is applied to the grid of trigger amplifier tube 28. This tube amplifies and inverts the trigger. Output from tube 28 is a negative pulse which appears at the plate winding of the blocking oscillator pulse transformer 30. The pulse is inverted in polarity by the pulse transformer and the resulting positive pulse is applied to the grids of tubes 24 and 26. This tube is operated as a blocked oscillator. A negative D.C. voltage is applied to the grids through the transformer secondary winding and resistances 32 and 34 prevent the circuit from oscillating of its own accord. The positive pulse that arises at the grids is of sufficient amplitude to overcome the fixed negative bias and starts the usual blocking oscillator action. The output of the blocking oscillator at the cathode is a positive pulse which is fed back to the gating multivibrator to shut off the negative gate and thus terminate the sweep. The range switch 14 has four positions. The position of range switch 14 determines the amount of positive potential applied to the grid of tube 10. The range selector switch is set to coincide with the maximum negative level of the input sawtooth wave. Thus, in operation, regardless of the setting of the range switch 14, the bias tube 22 will compensate for different positions of this switch and therefore compensates for operating voltage changes in the pulse and generating circuit. Thus, a stable pulse is generated which is not dependent upon the magnitude of the input sawtooth wave.

Obviously many modifications and variations of the present invention are possible in the light of the above teachings. It is therefore to be understood that within the scope of the appended claims the invention may be practiced otherwise than as specifically described.

What is claimed is:

1. A pulse generator for providing a stable output pulse which is independent of the magnitude of a sawtooth input signal applied thereto, comprising:

a switch means;

a shock excited oscillator means, coupled to said switch means, having an electronic valve means including, a control means, an electron emitting means, and an electron collecting means;

first variable bias means, directly switchably coupled to said control means, for providing a value of bias thereon which conforms to the magnitude of said sawtooth input signal, second variable bias means, directly coupled to said electron emitting means, for automatically adjusting the bias of said electronic valve means for different values of bias derived from said first variable bias means.

2. A pulse generator for providing a stable output pulse which is independent of the magnitude of a sawtooth input signal applied thereto, comprising;

a shock excited oscillator means having an electronic valve means including a control electrode for biasing said electronic valve means;

first variable bias means, directly coupled to said control electrode, for providing a value of bias thereon which conforms to the magnitude of said sawtooth input signal; and second variable bias means, directly coupled to said electronic valve means, for automatically adjusting the bias of said electronic valve means for different valves of bias derived from said first variable bias means.

References Cited by the Examiner

UNITED STATES PATENTS

| | | | |
|---|---|---|---|
| 2,668,236 | 2/54 | McCoy | 328—113 |
| 2,676,251 | 4/54 | Scarbrough | 328—223 |
| 2,983,831 | 5/61 | Walton | 328—183 |

ARTHUR GAUSS, *Primary Examiner.*